United States Patent
Bilmayer et al.

(10) Patent No.: US 7,887,069 B2
(45) Date of Patent: Feb. 15, 2011

(54) TOOTHED RACK OR THREADED ROD

(75) Inventors: Roman Bilmayer, Mauren (LI); Ralf Eckstein, Feldkirch (AT); Alexander Kiforiuk, Ebersbach (DE); Frank Birkwald, Ostfildern (DE); Michael Stange, Echterdingen (DE)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 12/588,544

(22) Filed: Oct. 19, 2009

(65) Prior Publication Data
US 2010/0038167 A1  Feb. 18, 2010

Related U.S. Application Data

(63) Continuation of application No. PCT/AT2008/000138, filed on Apr. 15, 2008.

(30) Foreign Application Priority Data

Apr. 19, 2007 (DE) ........................ 10 2007 018 919
Jul. 2, 2007 (DE) ........................ 10 2007 030 674

(51) Int. Cl.
*F16D 1/064* (2006.01)
*B62D 3/12* (2006.01)

(52) U.S. Cl. ................. 280/93.514; 280/771; 180/400; 74/425; 74/492

(58) Field of Classification Search ............ 280/93.514, 280/771, 779; 180/400, 427, 428, 429; 403/286, 403/292, 300, 306, 332, 334, 408.1, 298, 403/296; 248/159; 74/425, 89.23, 424.71, 74/492, 10.39, 29, 89.11, 89.12, 89.17; *F16D 1/064*
See application file for complete search history.

(56) References Cited

U.S. PATENT DOCUMENTS 2,720,405 A * 10/1955 Kennedy .................... 403/183

(Continued)

FOREIGN PATENT DOCUMENTS

DE    1 525 201    12/1969

(Continued)

OTHER PUBLICATIONS

International Search Report issued Jul. 1, 2008 in International (PCT) Application No. PCT/AT2008/000138.

*Primary Examiner*—Ruth Ilan
*Assistant Examiner*—Keith Frisby
(74) *Attorney, Agent, or Firm*—Wenderoth, Lind & Ponack, L.L.P.

(57) ABSTRACT

A toothed rack or threaded rod, in particular for a steering mechanism for a motor vehicle, includes a first rod-shaped part which, as a function element of the toothed rack or threaded rod, includes at least one element for the conversion of a rotational movement into a translational movement, in particular a toothing and/or a threading for the engagement of a threaded nut or of a threaded drive, and a second rod-shaped part which is connected with the first rod-shaped part. The connection of the first with the second rod-shaped part takes place via a separate connection part which includes first and second connection pins, of which the first connection pin is held by press fit in the hollow volume opening out at the connection end of the first rod-shaped part and the second connection pin is held by press fit in the hollow volume opening out at the connection end of the second rod-shaped part. A section of the connection part located between the first and the second connection pin has at least over a region of its circumference a greater radial dimension than the first and the second rod-shaped part in the corresponding circumferential region.

20 Claims, 6 Drawing Sheets

U.S. PATENT DOCUMENTS

| | | | |
|---|---|---|---|
| 3,466,964 A | 9/1969 | Wingquist | |
| 4,774,852 A | 10/1988 | Matt | |
| 4,884,666 A | 12/1989 | Stahl | |
| 5,899,319 A | 5/1999 | Jarnagin | |
| 5,975,573 A * | 11/1999 | Belleau | 280/771 |
| 6,848,534 B2 | 2/2005 | Toyofuku et al. | |

FOREIGN PATENT DOCUMENTS

| | | |
|---|---|---|
| DE | 195 01 647 | 7/1996 |
| DE | 198 22 313 | 11/1998 |
| DE | 198 40 466 | 3/2000 |
| DE | 100 11 140 | 11/2000 |
| DE | 103 47 146 | 5/2005 |
| DE | 20 2005 000 430 | 6/2006 |
| DE | 10 2007 018 919 | 10/2008 |
| EP | 0 222 114 | 4/1989 |
| EP | 0 234 398 | 4/1989 |
| EP | 0 291 902 | 7/1991 |
| EP | 0 521 354 | 10/1994 |
| EP | 1 741 945 | 1/2007 |
| FR | 2 513 203 | 3/1983 |
| JP | 2001-30930 | 2/2001 |
| WO | 03/013938 | 2/2003 |
| WO | 2006/047825 | 5/2006 |
| WO | 2006/066309 | 6/2006 |
| WO | 2006/136252 | 12/2006 |

\* cited by examiner

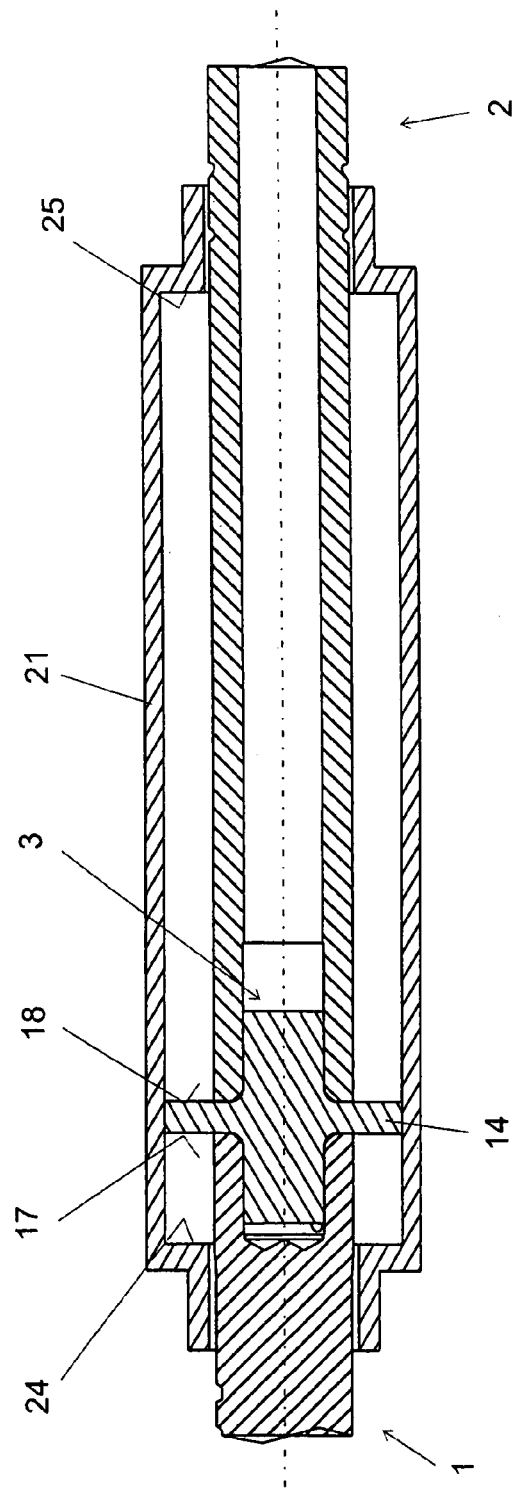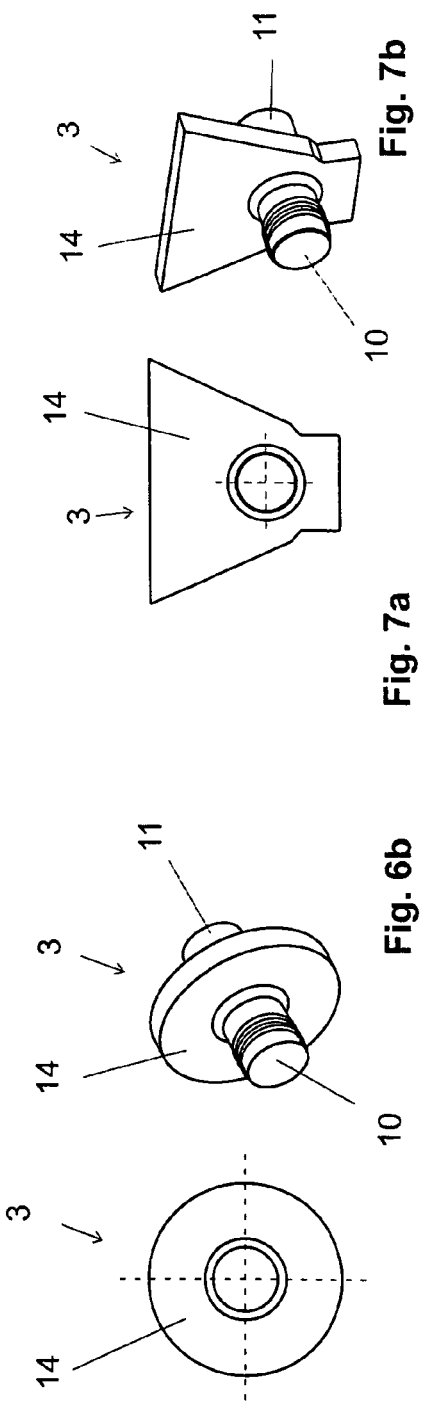
Fig. 5
Fig. 6a Fig. 6b
Fig. 7a Fig. 7b

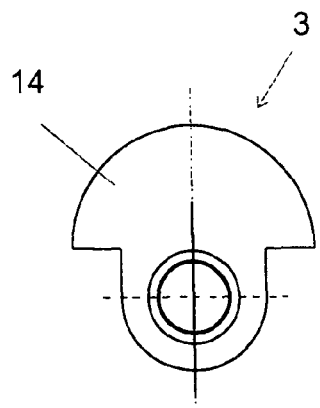
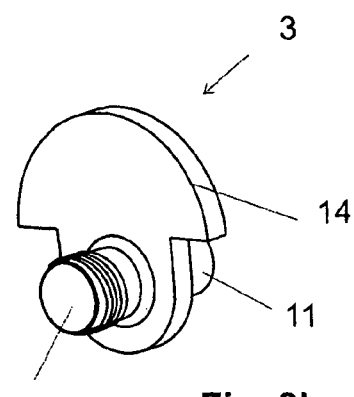
Fig. 8a    Fig. 8b
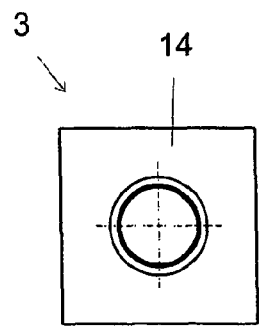
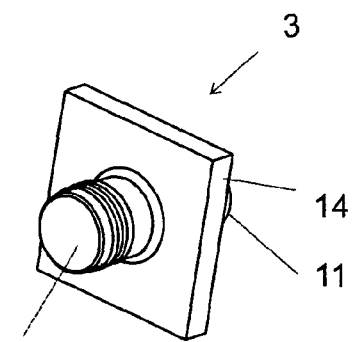
Fig. 9a    Fig. 9b
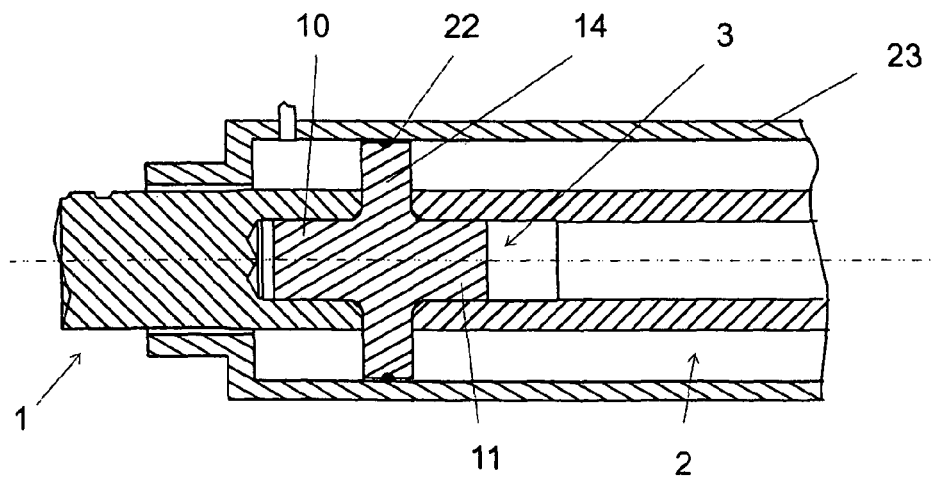
Fig. 10

US 7,887,069 B2

TOOTHED RACK OR THREADED ROD

This is a continuation of international application PCT/AT2008/000138, filed Apr. 15, 2008, the entire disclosure of which is incorporated herein by reference.

BACKGROUND OF THE INVENTION a) Field of the Invention

The invention relates to a toothed rack or threaded rod, in particular for a steering mechanism for a motor vehicle, which comprises a first rod-shaped part which, as a function element of the toothed rack or threaded rod, comprises at least one element for the conversion of a rotational movement into a translational movement, in particular a toothing and/or threading for the engagement of a threaded nut or of a threaded drive, and a second rod-shaped part which is connected with the first rod-shaped part and which preferably comprises at least one further function element of the toothed rack or of the threaded rod. The first and the second rod-shaped parts each has a hollow volume opening out at one connection end of the particular rod-shaped part and the connection of the first with the second rod-shaped part takes place via a separate connection part having first and second connection pins. The first connection pin is held by press fit in the hollow volume, opening out at the connection end, of the first rod-shaped part and the second connection pin is held by press fit in the hollow volume, opening out at the connection end, of the second rod-shaped part.

b) Description of Related Prior Art

Toothed racks or threaded rods, for example toothed racks or threaded rods employed in steering mechanisms of motor vehicles, conventionally comprise several function regions each forming a section of the longitudinal dimension of the toothed rack or threaded rod. One function region serves for converting the rotational movement, such as is introduced by a steering wheel of a motor vehicle into a steering system, into a translational movement, such as is required in this example for turning the wheels of the motor vehicle. For this purpose one function region includes as a function element at least one toothing and/or threading for the engagement of a threaded nut, in particular a ball-type threaded nut, or of a threaded drive, in particular a ball-type threaded drive. At its ends in the axial direction the toothed rack or threaded rod comprises function elements for securing in position elements connected with the wheel, for example the tie rods. In a further function region, for example in addition to a toothing in the first function region, a threading, for example for a ball-type threaded gear, can further be provided in order to implement a threaded drive by means of a nut disposed on this threading. This threaded gear can be utilized for a power assistance of the steering movement. The toothed rack or threaded rod can, instead, also comprise in at least one further function region other types of function elements. For example, at one rod section of the toothed rack or threaded rod a piston for a power assistance of the steering can be provided or form elements for securing such in position. As such, a function region can also be a smooth rod section serving for the axial guidance of the toothed rack or threaded rod, which rod section forms a bearing face. For the implementation of the several function elements, different fabrication steps must be completed in the production of the toothed rack or threaded rod.

To make possible better adaptation to the implementation of the individual function region, toothed racks are already known in which a first and a second rod-shaped part, each of which includes a function element of the toothed rack, are connection with one another. Apart from known welding of these two rod-shaped parts, WO 2006/066309 A1 also discloses a bolted connection of the two rod-shaped parts. A connection pin disposed on one part is herein provided with outer threads and is screwed into inner threads of an axial hollow volume, receiving the connection pin, of the other rod-shaped part. To secure this bolted connection serves in one embodiment an adhesive agent. In another embodiment example the wall encompassing the hollow volume receiving the pin is pressed at one site into an indentation of the pin. While through this implementation of the toothed rack with the division of the toothed rack into two or several rod-shaped parts having function regions, facilitation and improvement in the production is attained compared to the implementation of the toothed rack in one piece, the described bolted connection, however, also entails disadvantages, inter alia corresponding production expenditures and restrictions with respect to the implementation of the parts to be connected.

A device of the above described type is evident in the not prior published DE 10 2007 018 919 A1. To connect the first and second rod-shaped parts, a connection part is provided which includes first and second connection pins, each of which is held through a press fit in a hollow volume of the particular rod-shaped part. Through the press fit of the connection part with the particular rod-shaped part a reliable connection can be achieved between the first and the second rod-shaped part.

SUMMARY OF THE INVENTION

The problem addressed by the invention is providing broadened application feasibilities in a device of the type described in the introduction. This is achieved according to the invention through a toothed rack or threaded rod comprising a first rod-shaped part which comprises as a function element of the toothed rack or threaded rod at least one element for the conversion of a rotational movement into a translational movement and a hollow volume opening out at a connection end, a second rod-shaped part which is connected with the first rod-shaped part and which comprises a hollow volume opening out at a connection end, and a separate connection part via which the connection of the first with the second rod-shaped part takes place and which comprises first and second connection pins, of which the first connection pin is held by press fit in the hollow volume opening out at the connection end of the first rod-shaped part and the second connection pin is held by press fit in the hollow volume opening out at the connection end of the second rod-shaped part, wherein a section of the connection part located between the first and the second connection pin has at least over a region of its circumference a greater radial dimension than the first and the second rod-shaped part in the corresponding circumferential region.

In a toothed rack or threaded rod according to the invention, a section of the connection part located between the first and the second connection pin has at least over a region of its circumference, preferably over its entire circumference, a greater radial implementation than the first and the second rod-shaped part in the corresponding circumferential region. Thereby a function can be fulfilled by this projecting section of the connection part, i.e. this section forms a function section of the connection part or a further function element of the toothed rack. The projecting side faces of the function section of the connection part, which are preferably oriented in the axial direction of the toothed rack or threaded rod, can form stop faces for limiting the axial displacement of the toothed rack or threaded rod. The central section of the connection part located between the first and the second connection pin or between the first and the second rod-shaped part, can, for example, also form a gearing member, for example a member of a sliding gear drive, or a piston of a cylinder-piston unit.

In principle, it is also conceivable and feasible that the section of the connection part located between the first and the second connection pin has only over a portion of its circumference a greater radial dimension than the first and second rod-shaped part in the corresponding circumferential section.

The section of the connection part between the first and the second connection pin has, preferably over at least a portion of its circumferential extension, a radial dimension greater by at least 10%, preferably by at least 20%, than the first and second rod-shaped part at the particular adjacent end region.

The connection part can in particular be implemented as a straight part with axially oriented coaxial connection pins, preferably lying precisely in one axis. In connection with also straight rod-shaped parts, an overall straight toothed rack or threaded rod can be implemented.

The connection pin or the connection pins of the connection part are advantageously considerably shorter than the first and second rod-shaped part; the length of the connection pin is preferably less than the four-fold, again preferably less than the two-fold, however always more than half, of the amount of the outer diameter of the connection pin.

Each of the connection pins held by press fit in a hollow volume is preferably provided in the region of the press fit with material elevations, in particular beads, webs, teeth or the like. The height of these material elevations is herein preferably in the range from 0.03 mm to 0.4 mm. Additionally, or instead, the wall of the particular hollow volume receiving a connection pin could also be provided with material elevations, in particular beads, webs, teeth or the like. The height of these material elevations is herein also preferably in the range from 0.03 mm to 0.4 mm.

These material elevations are with advantage introduced using a forming process, such as roller-burnishing or knurling, into the surface of the connection pin and, if feasible, also into the inner surface of the hollow volume. The advantage lies in the material hardening entailed therein which leads to the reduction of chips and the improvement of the connection.

In an advantageous embodiment of the invention, the outer contour of the engagement section has substantially the form of a cylinder shell, i.e. apart from the preferably provided outer material elevations, end-side chamfers or inlet slopes or the like. The inner hollow volume receiving the particular connection pin is preferably implemented substantially cylindrical, i.e. apart from optionally provided material elevations, an end-side inlet funnel or the like.

The press fit implemented between the particular connection pin and the particular pin-shaped part is at least force-fit in the axial direction. By utilizing residual resiliencies it is also conceivable and feasible to implement a component of the connection that acts under form fit in the axial direction, for example by stress relief of a section of a material elevation disposed on the wall delimiting the hollow volume of the rod-shaped part and extending in the longitudinal direction, which section, referred to the slide-in direction of the connection pin, is located behind a material elevation disposed on the outer surface of the connection pin and extending in the circumferential direction.

In the circumferential direction each connection pin is held through the press fit at least under force-fit in the particular hollow. The connection is preferably additionally implemented such that it is form-fit. This can, for example, be attained through material elevations on the outer surface of the connection pin and/or on the wall encompassing the hollow volume in its region of the press fit, which during the implementation of the press fit form into or carve into the material of the other part connected via the press connection. The indentations implemented herein are preferably not, or only to a minimal degree, formed by machining, but rather entirely or at least largely through material displacement.

Before the forming production of the material elevations the inner diameter of the cylindrically implemented hollow volume is advantageously minimally greater than the outer diameter of the cylinder shell-shaped connection pin, such that both parts could be slid one into the other with minimal play, wherein only through the diameter enlargement or diameter reduction, respectively, entailed in the generation of the material elevations, in at least one of the two parts, the partial coverage necessary for the interference fit is obtained. It becomes thereby possible to compensate form, dimension and position discrepancies of the cylindrical inner form of the hollow volume and of the cylindrical shell surface of the connection pin. Further, the orientation of the parts to be jointed with respect to each other is simplified. The connection is additionally with advantage so laid out that a widening of the outer diameter of the region of the jointing partner into which the connection pin penetrates, is nearly prevented. The values of the widening of the outer diameter should herein be below 0.2 mm, especially preferably be below 0.05 mm. This reduces the material volume which must be removed if in the region of the jointing site a constant outer diameter is demanded. This further lowers the cracking risk in the wall of the hollow volume, such that the strength of the connection is ensured. In the case of a noncylindrical formation of the connection pin and of the hollow volume, this applies analogously. The only minimal widening in this case is even more important since nonround circumferential contours tend more readily to a notch effect and cracks can more easily form.

In an alternative embodiment it is conceivable and feasible to effect the connection of the rod-shaped parts of the toothed rack by means of welding, in particular laser welding. The connection part comprising the connection pins is herein additionally, or alternatively to the press fit, welded to the one or to both rod-shaped parts of the toothed rack.

Within the scope of the invention the term "toothed rack" comprises also a threaded rod which, for the conversion of the rotational movement into a translational movement, does not include toothing but rather only a threading for a threaded nut, for example a ball-type threaded nut, or a threaded drive, for example a ball-type threaded drive. Such threaded rods are applied in steer-by-wire steering systems, in which the rotational movement introduced by the steering wheel is, mechanically decoupled, transmitted via an auxiliary force device into a turning of the wheels. In the following description, consequently, under the term "toothed rack" the term "threaded rod" is also subsumed and under a toothing as a function element also the implementation as threading is subsumed.

BRIEF DESCRIPTION OF THE DRAWINGS

Further advantages and details of the invention will be explained in the following with reference to the enclosed drawings, in which:

FIG. 5 shows an example of a function exercised by the function section of the connection part, FIG. 6a, 6b; 7a, 7b; 8a, 8b; 9a, 9b show further feasible embodiments of connection parts, each in view and oblique view, FIG. 10 shows a further example of a function exercised by the function section of the connection part.

DETAILED DESCRIPTION OF THE PREFERRED EMBODIMENTS

Figure 1:
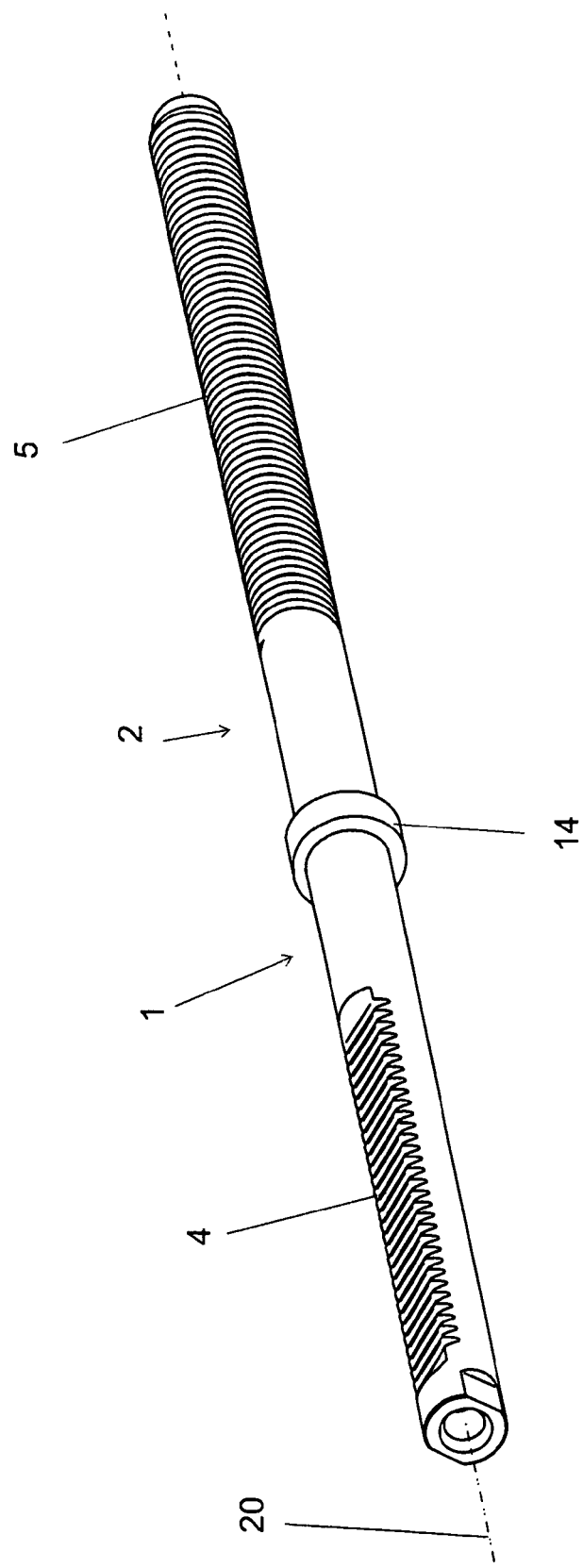
FIG. 1 shows a first embodiment of a toothed rack according to the invention, in oblique view.
Figure 2:
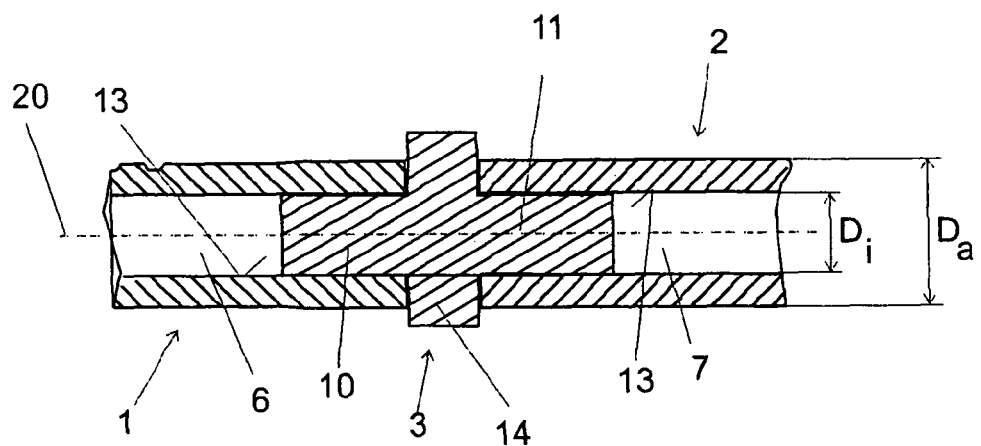
FIG. 2 shows a longitudinal center section in the connection region of the two rod-shaped parts.
Figure 4:
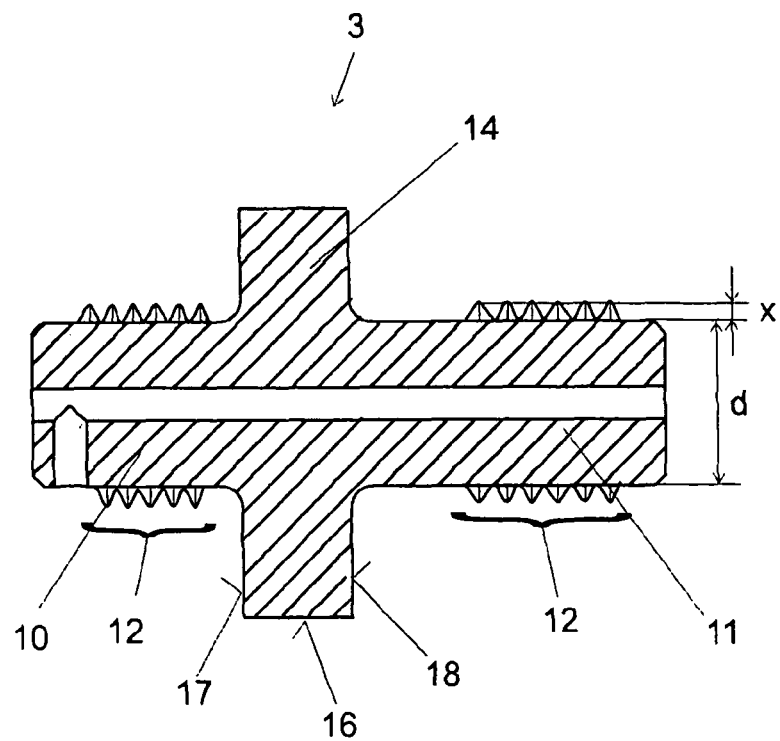
FIG. 4 shows a longitudinal center section through the connection part.

A first embodiment example of a toothed rack according to the invention, for example for application in a steering mechanism of a motor vehicle, will be explained in the following with reference to FIGS. 1 to 3. The toothed rack comprises a first and a second rod-shaped part 1, 2 connected with one another by means of a connection part 3. The first and the second rod-shaped part 1, 2 and the connection part 3 have a common longitudinal axis 20 (=the longitudinal axis of the toothed rack). The first rod-shaped part 1 has as a function element the toothing 4 of the toothed rack. The toothing 4 extends over a portion of the entire longitudinal dimension of the toothed rack and this portion of the longitudinal dimension of the toothed rack forms thus a first function region of the toothed rack.

The second rod-shaped part has as a function element a threading 5, for example for a ball-type threaded drive. This extends over a portion of the entire longitudinal dimension of the toothed rack and this portion of the longitudinal dimension of the toothed rack, consequently represents a second function region of the toothed rack, which is located in a different section of the longitudinal dimension of the toothed rack than the first function region.

Each of the first and the second rod-shaped parts 1, 2 consequently forms a different longitudinal section of the toothed rack.

The second rod-shaped part 2 could also include a different type of function element or a function region implemented in a different manner. When applied in a steering mechanism of a motor vehicle, the function region of the second rod-shaped part 2 could be, in particular, a part of an hydraulic steering power assistance.

The first and the second rod-shaped part 1, 2 have each a hollow volume 6, 7 extending in the axial direction. These hollow volumes 6, 7 open out at the connection ends 8, 9 directed toward one another of the rod-shaped parts 1, 2. In the embodiment according to FIGS. 1 to 3, these hollow volumes 6, 7 extend continuously over the entire length of the rod-shaped parts 1, 2, i.e. the rod-shaped parts 1, 2 are implemented as tubes. However, the hollow volume 6 of the first and/or the hollow volume 7 of the second rod-shaped part 1, 2 could also only extend over a portion of the axial length of the rod-shaped part 1, 2.

The connection part 3 includes first and second connection pins 10, 11, which project axially in opposite directions from a central section 14. The central section 14, which, with reference to the longitudinal axis 20, is located between the first and second connection pin 10, 11, has a greater outer diameter than the connection pins 10, 11. Expressed differently, it could also be stated that the connection part 3 in the region between the connection pins 10, 11 includes a projecting annular collar. In the embodiment according to FIGS. 1 to 4, the outer surface 16, encompassing the longitudinal axis 20, of the central projecting section 14 is implemented in the form of a cylinder shell. The side faces 17, 18 are oriented in the axial direction.

To connect the first and second rod-shaped part 1, 2 the connection pins 10, 11 are pressed into the particular hollow volume 6, 7, such that the connection pins 10, 11 in the connected state are each held in the hollow volumes 6, 7 through a particular press fit. The central section 14 in the connected state of parts 1, 2, 14 is located between the first and the second rod-shaped part 1, 2. In the connected state the side faces 17, 18 of the projecting section 14 are preferably in contact at the end-sides on the first and second rod-shaped part 1, 2.

Figure 3:
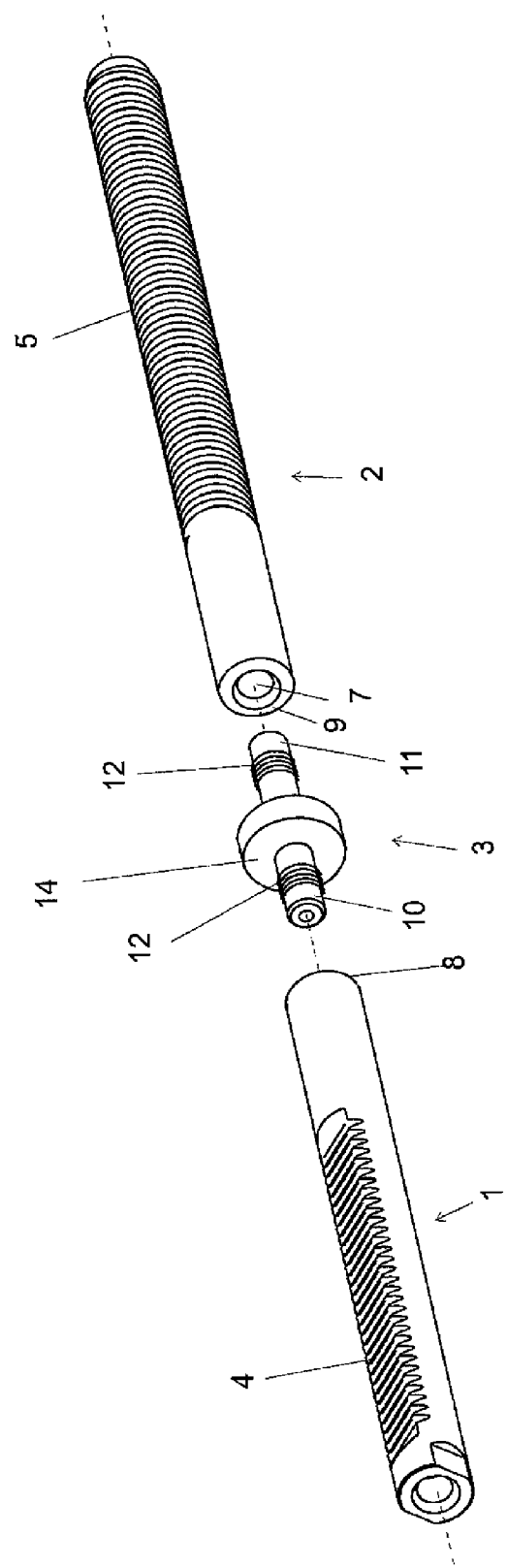
FIG. 3 shows the toothed rack of FIG. 1 before the connection of the parts.

The connection pins 10, 11 of connection part 3 are provided with material elevations 12 during its production, cf. FIG. 3. These material elevations 12 are deformed when the particular pin 10, 11 is pressed into the particular hollow volume 6, 7, whereby a strong and secure press fit can be implemented.

The material elevations 12 can be formed, for example, by combs, webs, teeth, beads or the like. In the embodiment example according to FIGS. 1 to 3 these material elevations extend in the circumferential direction. In this connection the combs, webs or teeth can exhibit an annular course or a pitch in the manner of threadings can be provided. Such material elevations 12 can also be referred to as roller-burnishings or as annular groove knurlings.

The material elevations 12 formed by beads, webs, teeth or the like can also have a different form. They can, for example extend in the axial direction. Such axially extending material elevations are also referred to as axial groove knurlings. Webs, beads or teeth or other types of material elevations, for example diamond knurlings, extending in an oblique direction can also be provided.

The material elevations 12 can preferably be implemented through material displacement, in particular by means of rolling tools, such as serve also for the production of rolled-on threadings.

In addition to, or instead of, the material elevations 12 of connection pins 10, 11, the wall 13 delimiting the particular hollow volume 6, 7 can be provided with material elevations at least in the section in which the press connection with the connection pin 10, 11 is completed. These material elevations can have the form already described in connection with the connection pins 10, 11. A preferred embodiment of such material elevations on the wall 13 of the particular hollow volume 6, 7 are herein teeth extending in the axial direction. Such teeth can form out indentations in the latter or in its material elevations 12 when the associated connection pin 10, 11 is pressed in. Through these indentations, a connection can be implemented acting under form closure against a relative turning out of place of the connection pin 10, 11 with respect to the wall 13. Such indentations are preferably formed when the connection pin 10, 11 is pressed in, such that they are not or only to a small degree chip-forming but rather are formed entirely, or at least largely, through material displacement.

In the preferred case, in which the material elevations are implemented by forming, the outer diameter d of the cylindrical connection pin is minimally smaller than the inner diameter Di of the cylindrical hollow volume, such that without the encircling material elevations, the connection pin can be slid into the hollow volume with minimal play. Only through the material elevations on the connection pin, whose outer circumference describes a diameter d+2x, is the interference required for the press fit attained. Alternatively, or also in combination, this applies to the material elevations along the inner diameter of the hollow volume. The interference is herein preferably dimensioned at a size in the range from 0.05 mm to 0.25 mm, especially preferably approximately from 0.1 to 0.15 mm.

The press fit is advantageously laid out such that the outer diameter Da of the rod-shaped part does not expand by more than 0.2 mm, preferably by less than 0.1 mm.

The same applies also to non-cylindrical cross sections of the connection pin. In this case the twofold distance of the outer section in the particular angular section from the longitudinal axis is assumed as the diameter, such as is conventional when using polar coordinates.

Through the press fit of the connection pins 10, 11 in the hollow volumes 6, 7 a connection acting under force-fit is implemented. The springback effects in addition a component of the connection acting under form fit in the axial direction, acting, for example through stress relief of a section of a material elevation disposed on the wall 13 and extending in the longitudinal direction, which section, referring to the slide-in direction, is located behind a material elevation 12, extending in the circumferential direction, of the connection pin 10, 11.

The connection of the particular rod-shaped part 1, 2 with the connection part 3 takes place in a simple manner through axial pressing-together. A connection pin 10, 11 of connection part 3 is herein first pressed into one of the rod-shaped parts 1, 2 and subsequently the other connection pin 10, 11 is pressed into the other rod-shaped part 1, 2.

The invention also makes the production of toothed racks with non-cylindrical cross sectional surfaces feasible. It is feasible to connect rod-shaped parts 1, 2 with different cross sections as well as also rod-shaped parts 1, 2 with substantially identical cross sections. It is thereby feasible to lay out and produce every longitudinal section of the toothed rack in simple manner with the cross section optimal for the particular application and subsequently to join the separate parts to form a complete toothed rack. Depending on the dimensioning, for the connection can serve a substantially cylindrical connection pin 10 in cooperation with a substantially cylindrical but also in cooperation with a hollow volume 6 adapted to the outer shape, as well as also a connection pin 10 adapted to the outer shape.

The hollow volume 6, 7 of the first and/or second rod-shaped part 1, 2 can also be implemented such that it is not continuous over the length of the rod-shaped part 1, 2. The hollow volume 6 of the first rod-shaped part 1 is here implemented in the form of a pocket hole extending from the connection end 8 at its front side. Instead, or in addition, such an implementation can also be provided for the second rod-shaped part 2.

FIG. 5 illustrates by example a feasible function exerted by the central projecting section 14 of the connection part 1. The side faces 17, 18 of central section 14 in the region projecting over the first and second rod-shaped part 1, 2 each serve as a stop for limiting the axial displaceability of the toothed rack. The counterstops 24, 25 can, for example, be disposed on a housing 21 encompassing the toothed rack. If the toothed rack is applied in a motor vehicle, the housing 21 is stationary on the automobile body.

In FIGS. 6a, 6b to 9a, 9b are depicted by example different outer contours of the function section 14 of connection part 3 or different implementations of the outer surface 16, encompassing the longitudinal axis 20, of function section 14 of connection part 3. FIG. 6a, 6b show an already described annular implementation of the projecting collar. FIGS. 7a, 7b and 8a, 8b show embodiments with the implementation of the projecting section 14 that is not circumferentially symmetric. FIG. 9a, 9b show a cuboid implementation of section 14, wherein the peripheral contour, viewed in front view, can be, for example, square.

Such function sections 14 implemented with different circumferential contours can represent, for example, gearing members, for example of a sliding gear drive.

FIG. 10 shows a further feasible embodiment variant. Section 14, provided at its outer circumference with a seal 22, forms here a piston which is displaceable in a cylinder 23. In such an embodiment the section 14 could represent, for example, a function element for introducing an auxiliary force in a steering. An autonomous steering function could also be provided in this manner.

Figure 11:
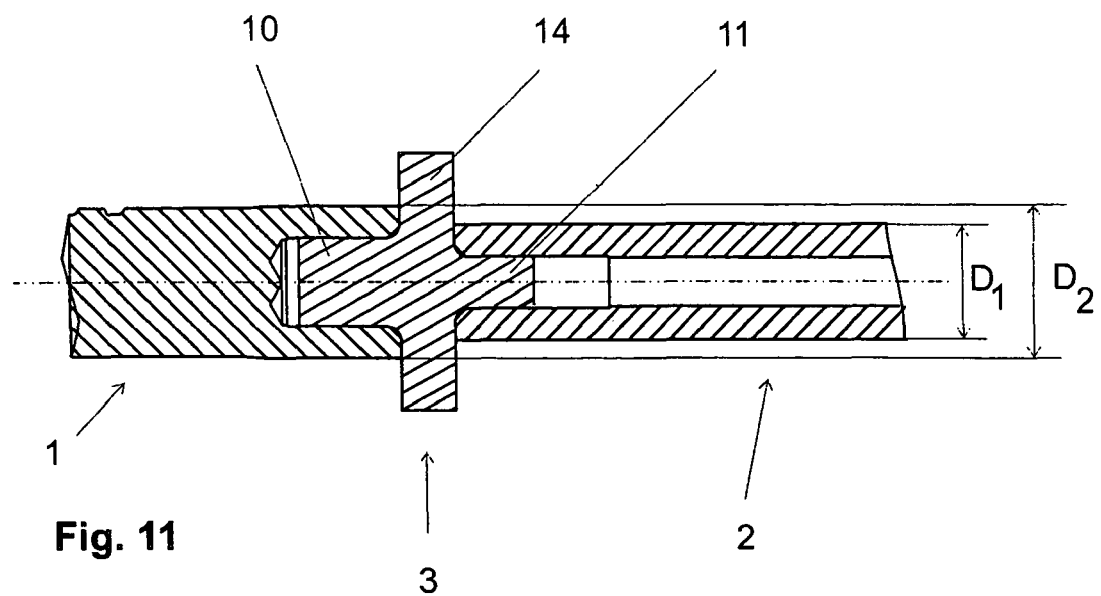
FIG. 11 shows a longitudinal center section through a further embodiment variant of the invention.

FIG. 11 illustrates an embodiment, in which the first rod-shaped part 1 has an outer diameter D1 and the second rod-shaped part 2 an outer diameter D2, wherein the two outer diameters D1 and D2 have different values.

The two rod-shaped parts 1, 2 can be comprised of the same material, for example steel, or also of different materials, for example different steels. By implementing the parts of different materials, the rod-shaped parts 1, 2 can each be adapted to the function to be exercised by them.

The connection part 3 can be comprised of the same material, for example steel, like the two rod-shaped parts 1, 2 or one of these two parts 1, 2 or they can be comprised of a different material, for example a different steel.

For the additional securement of the press connection between the connection part 3 and one or two rod-shaped parts 1, 2, the particular rod-shaped part 1, 2 could, after the connection pin 10, 11 has been pressed in, be provided in the connection region with the connection pin 10, 11 with a radial press-in which projects into an indentation in the connection pin 10, 11.

The connection part 3 could also include an inner channel continuous over its length and opening out at the front-side ends of its two connection pins 10, 11.

The second rod-shaped part 2 can also include function elements different from threading 5. It could, for example, be provided with a piston as the function element or the function element could also be formed by an outer guide face, which, in connection with a guide part, serves for the implementation of an axial guidance of the toothed rack.

In all of the depicted embodiment examples, at the end of the second rod-shaped part 2 remote from the first rod-shaped part 1, as the function element a connection element can be disposed for the connection with a part actuated by the toothed rack. This function element can also be the sole function element of the second rod-shaped part 2.

The second rod-shaped part 2 can also at the end remote from the first rod-shaped part 1 be connected with a further rod-shaped part, in particular through a connection corresponding to the connection between the first and the second rod-shaped part 1, 2. The sole function of the second rod-shaped part 2 can herein also be the connection function with this further rod-shaped part, which can comprise a further function element.

At the end remote from the second rod-shaped part of the first rod-shaped part 1, it can be connected with one or several further rod-shaped parts, in particular through a connection corresponding to the connection between the first and the second rod-shaped part 1, 2. At least one of these further rod-shaped parts can comprise a further function element.

In this manner, a toothed rack can be formed from more than two single parts produced separately using the method according to the invention a toothed rack can be formed.

Various different types of material elevations could be provided on the connection pins 10, 11 and/or on the walls of hollow volumes 6, 7 in the connection region. On the connection pins 10, 11 can be provided for example teeth, webs or beads extending in the axial direction.

A tubular implementation of the first and/or second rod-shaped part 1, 2 could also be formed by forming a planar sheet which is bent tubularly and which encompasses the longitudinal axis 20. The edges coming into contact with one another of the sheet can herein be connected with one another by a welding seam.

Alternatively to the implementation of the first and/or second rod-shaped part 1, 2 with a substantially cylindrical outer surface, the previously described method can also be applied for the implementation of other cross sectional shapes.

Each of the hollow volumes 6, 7 receiving a connection pin 10, 11 is preferably provided with a funnel-shaped which widens toward adjoining the connection end 8, 9 in order to facilitate pressing in a connection pin 10, 11. Additionally, or instead, a particular connection pin 10, 11 can be tapered toward its end.

As is evident based on the above description, the scope of the invention is not limited to the depicted embodiment examples but rather should be determined with reference to the attached claims together with their full range of possible equivalents.

LEGEND TO THE REFERENCE SYMBOLS

1 First rod-shaped part
2 Second rod-shaped part
3 Connection part
4 Toothing
5 Threading
6 Hollow volume
7 Hollow volume
8 Connection end
9 Connection end
10 Connection pin
11 Connection pin
12 Material elevation
13 Wall
14 Section
15 Contact face
16 Outer surface
17 Side face
18 Side face
20 Longitudinal axis
21 Housing
22 Seal
23 Cylinder
24 Counterstop
25 Counterstop
d Outer diameter
Di Inner diameter
Da Outer diameter

The invention claimed is:

1. A component for a steering mechanism for a motor vehicle, the component comprising:
   a first rod-shaped part which has a connection end and a function element for conversion of rotational movement into translational movement, the first rod-shaped part having a hollow volume opening out at the connection end;
   a second rod-shaped part connected with the first rod-shaped part, the second rod-shaped part having a connection end and a hollow volume opening out at the connection end; and
   a separate one-piece connection part connecting the first rod-shaped part to the second rod-shaped part, the connection part including a first connection pin and a second connection pin, the first connection pin being press fit in the hollow volume of the first rod-shaped part, and the second connection pin being press fit in the hollow volume of the second rod-shaped part,
   wherein a section of the connection part located between the first connection pin and the second connection pin has a radial dimension over at least a region of a circumference of the section greater than the first and second rod-shaped parts in a corresponding circumferential region, and
   wherein each of the connection pins comprises material elevations.

2. The component of claim 1, wherein the function element of the first rod-shaped part is a toothing and/or a threading for the engagement of a threaded nut or a threaded drive.

3. The component of claim 1, wherein the second rod-shaped part comprises a toothed rack or threaded rod.

4. The component of claim 1, wherein the section of the connection part located between the first connection pin and the second connection pin has a greater radial dimension over the entire circumference of the section than the first and second rod-shaped parts.

5. The component of claim 1, wherein the section of the connection part located between the first and the second connection pins has an outer surface shaped in the form of a cylinder shell.

6. The component of claim 1, wherein the first and the second rod-shaped parts have different diameters.

7. The component of claim 1, wherein the first and the second rod-shaped parts have different cross sections.

8. The component of claim 1, wherein the first and the second rod-shaped parts are comprised of different materials.

9. The component of claim 1, wherein the connection part is straight and the connection pins extend axially in opposite directions.

10. The component of claim 1, wherein the first rod-shaped part and/or the second rod-shaped part are connected with the connection part using welding.

11. The component of claim 1, wherein the section of the connection part located between the first and the second connection pins forms a function section of the connection part having projecting side faces, wherein the projecting side faces of the function section of the connection part form stop faces for limiting the axial displacement of the component.

12. The component of claim 1, wherein the section of the connection part located between the first and the second connection pins forms a function section of the connection part having projecting side faces, wherein the function section of the connection part forms a member of a sliding gear drive.

13. The component of claim 1, wherein the section of the connection part located between the first and the second connection pins forms a function section of the connection part having projecting side faces, wherein the function section of the connection part forms a piston of a cylinder-piston unit.

14. The component of claim 1, wherein the section of the connection part located between the first and the second connection pins has a radial dimension at least over a region of its circumference greater by at least 10% than adjacent regions of the first and of the second rod-shaped parts in the corresponding circumferential region.

15. The component of claim 1, wherein the section of the connection part located between the first and the second connection pins has at least over a region of its circumference a radial dimension greater by at least 20% than adjacent regions of the first and of the second rod-shaped parts in the corresponding circumferential region.

16. The component of claim 1, wherein the first rod-shaped part and the second-rod shaped part form a toothed rack or threaded rod.

17. The component of claim 1, wherein the connection end of the first rod-shaped part and the connection end of the second rod-shaped part contact the section of the connection part located between the first connection pin and the second connection pin.

18. A steering mechanism for a motor vehicle, the steering mechanism comprising:
 a first rod-shaped part which has a connection end and a function element for conversion of rotational movement into translational movement, the first rod-shaped part having a hollow volume opening out at the connection end;
 a second rod-shaped part connected with the first rod-shaped part, the second rod-shaped part having a connection end and a hollow volume opening out at the connection end; and
 a separate one-piece connection part connecting the first rod-shaped part to the second rod-shaped part, the connection part including a first connection pin and a second connection pin, the first connection pin being press fit in the hollow volume of the first rod-shaped part, and the second connection pin being press fit in the hollow volume of the second rod-shaped part,
 wherein a section of the connection part located between the first connection pin and the second connection pin has a radial dimension over at least a region of a circumference of the section greater than the first and second rod-shaped parts in a corresponding circumferential region, and
 wherein each of the connection pins comprises material elevations.

19. The steering mechanism of claim 18, further comprising:
 a housing having counter stops,
 wherein the connection part, the connection end of the first rod-shaped part, and the connection end of the second rod-shaped part are disposed in the housing,
 wherein the section of the connection part located between the first and the second connection pins forms a function section of the connection part having projecting side faces, the projecting side faces of the function section of the connection part forming stop faces for limiting the axial displacement of the connection part,
 wherein the connection part is movable within the housing and arranged within the housing such that the stop faces abut against the counter stops to limit the axial displacement of the connection part.

20. The steering mechanism of claim 18, wherein the first rod-shaped part and the second-rod shaped part form a toothed rack or threaded rod.

\* \* \* \* \*